(No Model.)

E. M. BENTLEY.
ELECTRIC RAILWAY.

No. 338,022. Patented Mar. 16, 1886.

WITNESSES
Albert E. Lynch
Wm. M. Monroe

INVENTOR
Edward M. Bentley
by Bentley & Knight
attys

UNITED STATES PATENT OFFICE.

EDWARD M. BENTLEY, OF BROOKLYN, NEW YORK.

ELECTRIC RAILWAY.

SPECIFICATION forming part of Letters Patent No. 338,022, dated March 16, 1886.

Application filed July 10, 1885. Serial No. 171,196. (No model.)

*To all whom it may concern:*

Be it known that I, EDWARD M. BENTLEY, a citizen of the United States, and a resident of Brooklyn, New York, have invented certain new and useful Improvements in Electric Railways, of which the following is a specification.

My invention consists in certain devices for branch electric railways, and is especially applicable to electric railways in which two independent conductors are employed, inclosed in a slotted conduit; but the principles of my invention may also be applied to a railway in which the track-rails or the conduit constitutes one of the conductors, the other being insulated in the same manner as the two conductors are in the railway I have shown for illustration.

Figure 1:
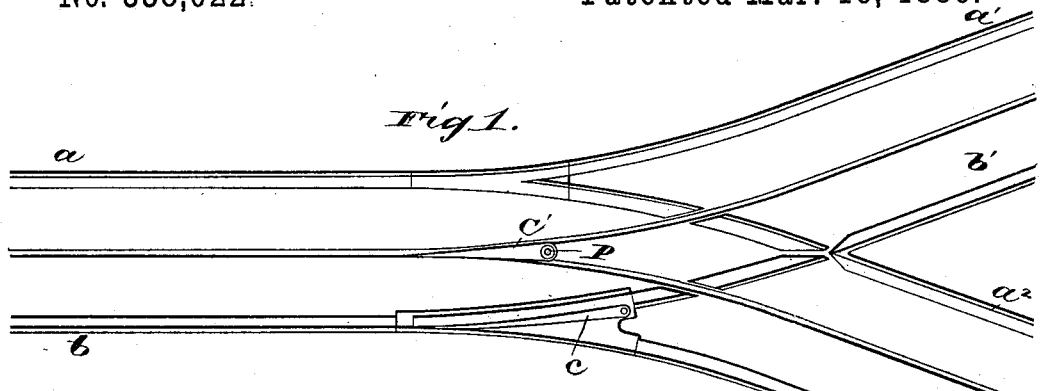
Figure 2:
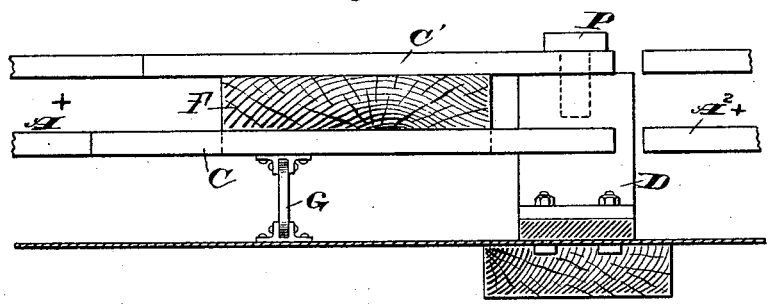
Figure 3:
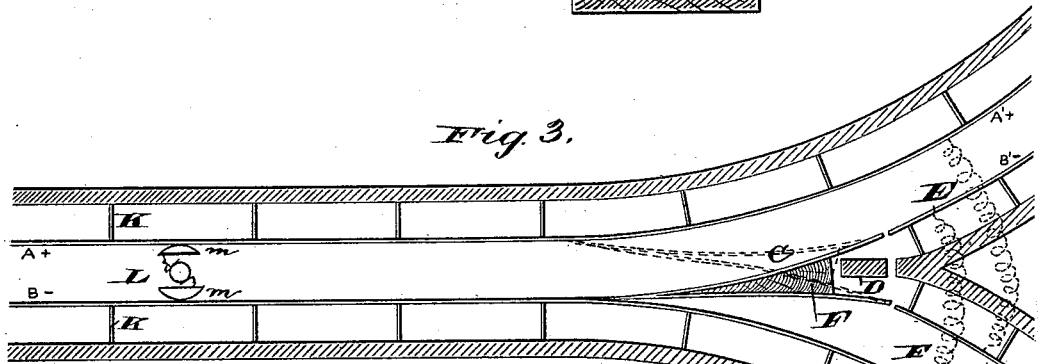
Figure 4:
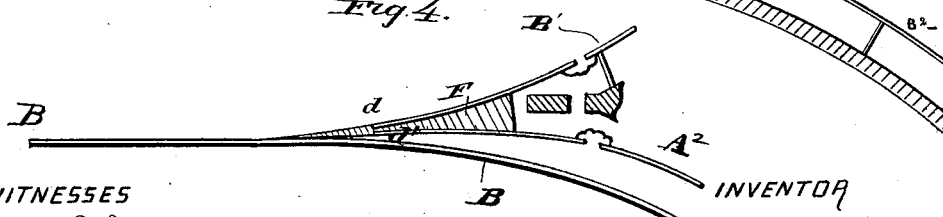

In the accompanying drawings, Figure 1 is a plan view of a branching electric railway and a branching slotted conduit with switching-points for the conduit-slot and for the track. Fig. 2 is a side elevation of the switching-points for the slot and the conductor. Fig. 3 is a plan view of the conduit with the top removed, showing the insulated conductors and the conductor-switching point. Fig. 4 is a modified form of conductor-point.

In Fig. 1, $a$ and $b$ are the track-rails of the railway, and $a'$ $b'$ and $a^2$ $b^2$ are the rails of two branch tracks, respectively, arranged in the usual manner. $c$ is a pivoted switch-point for directing a vehicle onto either branch track. The slot of the conduit is shown midway between the two rails, and is branched correspondingly with the track.

The slotted conduit is of any well-known construction, and therefore does not need any further description herein.

In Fig. 3, A A' represent the positive conductor of the electric railway, supported from the side walls of the conduit by insulating-pins K. $A^2$ represents a corresponding positive conductor, which extends along the branch track, and is connected to A A' by the wire E. B $B^2$ is the negative conductor corresponding to the positive conductor, and B' is a branch thereof corresponding to the positive branch $A^2$. At the point of branching is pivoted an independent conductor-point, C, which is normally in connection electrically with neither positive nor negative conductor, but is adapted to be turned from one side to the other to form a connection between either positive or negative branch conductors and the corresponding main conductor. In Fig. 3 this point C is shown in the position to form a continuation of the branch conductor B', leading to the main conductor B. This conductor-point is connected by means of the insulating block F to the slot-point C', which is pivoted by a bolt, P, to the standard D, the swinging support G being placed under its outer end. By this means both the conductor-point and the slot-point move simultaneously.

The slot-point C', as is shown in Fig. 1, is adapted to be turned so as to make the main slot continuous with either branch slot, and any depending conductor extending from the traveling vehicle into the conduit through the slot will be guided by the proper position of the said point C' from the main slot into either branch slot at will. The slot-point C' is shown flush with the surface of the conduit.

The means which I employ for maintaining a continuous connection between the two main conductors and the traveling locomotive on the road are not shown in detail herein, they being similar to that which is shown in Patent No. 305,731, granted to Walter H. Knight, September 23, 1884. They are indicated, however, in Fig. 3 by the two shoes $m$ $m'$, L representing the motor. It will be seen that in operation the two contacts, sliding along the positive and negative conductors A and B, will be guided into either branch, according to the position of the conductor-point C. In Fig. 3, the motor passing from left to right, the two contact-shoes $m$ $m'$ will be guided so as to pass into the upper branch, the conductor-point C having its extremity resting against the negative conductor B, and being therefore in electrical connection with it, while, if the conductor-point were turned into the position shown by the dotted lines, the contact-shoes would be guided into the lower branch, and the conductor-point, resting against the main positive conductor, would be in electrical connection therewith, and in either case the contact-shoes would pass into the desired branch, and the electrical connection with the proper conductors would be constantly maintained throughout. The slot-point C' being connected to the conductor-point, the position of the latter will be indicated upon the surface by the position of the former, the former also serving to guide the part of the contact device which passes through the slot in the same manner as the conductor-point guides the shoes which rest against the conductors themselves.

Instead of having the conductor-point constructed of a single independent piece of metal, it may be made as shown in Fig. 4, $d$ and $d'$ representing two insulated strips placed upon opposite sides of the insulating-block F, and connected, respectively, to the positive and negative branch conductors B' and $A^2$. The insulating-block F is continued out to the point, so that neither $d$ nor $d'$ rests against the main conductors when the point is turned into its two operative positions, and any short-circuiting is thereby prevented.

Although I prefer in practice the form of point shown in Fig. 3, yet the principle of the two points is the same, there being in each case a movable conductor-point forming a continuation of the branch conductor and leading to its corresponding main conductor.

Having thus described my invention, what I claim is—

1. The combination, with the branching electric conductors extending along the two branches of an electric railway, respectively, of an independent conducting-point pivoted at the termination of the two inner conductors, so as to be turned to lead the sliding contact from either main conductor onto its corresponding branch conductor.

2. The combination, with the branching track-rails, of the independent conducting-rails branching correspondingly with the track-rails, and the independent movable conducting-point at the termination of the two inner conductors adapted to be turned to connect with either main conductor.

3. The combination of the continuous conductor A A' of an electric railway, the corresponding conductor, $A^2$, of a branching railway, and an intermediate movable section adapted to carry the contact device from A A' to $A^2$.

4. The combination of the conductors A A' and B $B^2$, the conductors $A^2$ and B', connected therewith, respectively, by bridging-conductors, and an independent movable conducting-point, C.

5. The combination of the positive and negative conductors A A' and B $B^2$ with the conductors B' and $A^2$, connected therewith, respectively, and the movable point forming a continuation with either B' or $A^2$.

6. The combination of the two continuous positive and negative conductors A A' and B $B^2$, the contact-shoes between said conductors and movable relatively thereto and adapted to slide in contact therewith, respectively, the positive and negative conductors $A^2$ and B', and the bridging-conductors connecting $A^2$ and B' with A A' and B $B^2$, respectively, and placed out of the path of said conducting-shoes.

7. The combination of the movable guide for the slot and a movable conductor-section supported therefrom.

8. The combination of the movable slot-guide, a conductor-section supported therefrom, and intervening insulating material.

9. The combination of a movable slot-guide for a branching slotted conduit, substantially as described, and a support for its outer end placed between the two branches of the slot.

10. The combination of a branching slotted conduit, insulated conductors in the main and in the branch conduit, substantially as described, a movable slot-guide, and a standard therefor placed within the two inner conductors.

11. The combination of a branching slotted conduit, conductor A A' in the main conduit, a corresponding conductor, $A^2$, in the branch conduit, a contact device, a movable slot-guide, and a standard therefor placed inside of conductor $A^2$.

12. The combination, with a branching railway-track, of a stationary branching slotted conduit and a movable conductor-section within the conduit for switching the contact device, and means for working said section from without the conduit.

13. The combination, with a branching railway-track, of a stationary branching slotted conduit inclosed in the main and in each branch conduit, and a movable conductor-section within the conduit for switching the contact device.

14. The combination, with a branching railway-track, of an insulated electric conductor on the main and on each branch track, a contact device adapted to connect said conductor with a vehicle traveling on the said track, a movable conductor-section for switching the contact device, and a slot-point connected to said movable section.

In testimony whereof I sign this specification, in the presence of two witnesses, this 22d day of June, A. D. 1885.

EDWARD M. BENTLEY.

Witnesses:
ALBERT E. LYNCH,
CHAS. H. DORER.